United States Patent [19]

Heynisch

[11] 3,739,294

[45] June 12, 1973

[54] AMPLIFIER WITH A VELOCITY-MODULATED TUBE AND A COMPENSATION CIRCUIT FOR THE CORRECTION OF PHASE DISTORTIONS

[75] Inventor: Hinrich Heynisch, Grafelfing, Germany

[73] Assignee: Siemens Aktiengesellschaft, Berlin and Munich, Germany

[22] Filed: July 28, 1971

[21] Appl. No.: 166,765

[52] U.S. Cl. .................. 330/44, 330/149, 332/37 R
[51] Int. Cl. .............................................. H03f 3/54
[58] Field of Search .........................330/44–46, 149; 333/28 R, 18 R, 1.1; 328/163; 332/7, 18, 37 R

[56] References Cited

UNITED STATES PATENTS

| | | | |
|---|---|---|---|
| 3,277,403 | 10/1966 | Cohn | 333/28 |
| 3,378,632 | 4/1968 | Lomer | 332/37 R X |
| 3,528,037 | 9/1970 | Vamazaki | 332/37 R |
| 3,422,378 | 1/1969 | Rosa | 333/28 |
| 2,981,837 | 4/1961 | Ruthroff | 333/1.1 UX |

FOREIGN PATENTS OR APPLICATIONS

| | | | |
|---|---|---|---|
| 1,203,838 | 9/1970 | Great Britain | 332/18 |

*Primary Examiner*—Roy Lake
*Assistant Examiner*—James B. Mullins
*Attorney*—Hill, Sherman, Meroni, Gross & Simpson

[57] ABSTRACT

An amplifier with a velocity-modulated tube and a phase compensation circuit connected to the output of the tube wherein a controllable reactance is included within the phase compensation circuit and controlled in accordance with the modulation of the velocity-modulated tube by way of a directional coupler and a demodulator. The output signal of the velocity-modulated tube is reflected by way of a circulator and a line to which the controllable reactance is employed as a line termination so that the phase rotation provided by the reflected signal of the line compensates for the phase distortion of the amplifier signal which occurs in the velocity-modulated tube.

5 Claims, 1 Drawing Figure

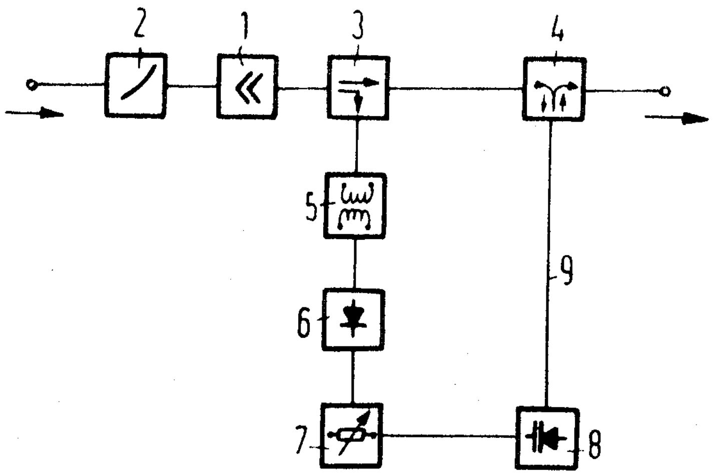
INVENTOR
Hinrich Heynisch
BY
Hill, Sherman, Meroni, Gross & Simpson
ATTYS.

AMPLIFIER WITH A VELOCITY-MODULATED TUBE AND A COMPENSATION CIRCUIT FOR THE CORRECTION OF PHASE DISTORTIONS

DESCRIPTION

This invention relates to an amplifier with a velocity-modulated tube and a compensation circuit which compensates a modulation-dependent phase distortion of the amplified signal.

The relationship between the output phase of an amplified signal of a velocity-modulated tube to the input phase depends on the modulation of the tube. Modulation-dependent (amplitude responding) phase distortions may occur in the output signal and such distortions serve to limit the practical modulability of the velocity-modulated tube to an essential degree in the linear range.

It has heretofore been proposed to compensate the modulation-dependent phase distortion by means of a suitable modulation-independent preceding phase correction with the aid of a compensation circuit which is connected to the input of the velocity-modulated tube. As will be indicated below, such arrangements have drawbacks which are overcome by the present invention.

The present invention is directed to an amplifier with a velocity-modulated tube and a compensation circuit connected to the output of the velocity-modulated tube. The compensation circuit comprises a directional coupler for decoupling a portion of the output signal, a demodulator connected to the directional coupler for deriving the modulation signal, a controllable reactance connected to and controlled by the demodulator, a circulator connected to the directional coupler and a transmission line connected between the circulator and the controllable reactance whereby the transmission line and reactance serve to receive the phase distorted output signal from the circulator and reflect thereto signals having opposite phase distortions.

It is therefore the primary object of this invention to increase the efficiency of phase compensation and to decrease the cost of apparatus for effecting improved phase compensation for a velocity modulated tube in the linear range.

According to one aspect of the invention, an amplifier includes a velocity modulated tube and a compensation circuit wherein the compensation circuit consists essentially only of a directional coupler, a demodulator, a controllable reactance, a circulator and a transmission line connected between the circulator and the controllable reactance. Of particular interest is that the compensation circuit is connected to the output of the velocity modulated tube.

The velocity modulated tube of such an amplifier can be much better modulated in the linear range than the velocity modulated tube of an amplifier having a compensation circuit as heretofore proposed without having to experience unavoidable phase distortions. Furthermore, a compensation circuit which is connected to the output of the velocity-modulated tube does not require an additional amplifier, as opposed to the prior art compensation circuit which is connected to the input of the velocity-modulated tube. This is a particular advantage which not only saves the cost of a broad band amplifier but also provides that the compensation can be carried out over a broader band than with the application of such an amplifier. This particular advantage is very important, for example, in applications where there is a simultaneous transmission of sound and picture signals in television transformers or in color television transmitters. Furthermore, a phase equalization or balancing of the electrical length of the compensation circuit is less critical when the compensation circuit is connected to the output of the velocity-modulated tube.

An advantageous embodiment of the invention may also comprise an adjustable damping member connected between the modulator and the controllable reactance for providing a precision adjustment for the operation of the controllable reactance.

BRIEF DESCRIPTION OF THE DRAWING

The foregoing and other objects, features and advantages of the invention, its organization, construction, and operation will best be understood from the following detailed description taken in conjunction with the accompanying drawing, in which a single FIGURE is a schematic diagram of an amplifier including a velocity-modulated tube and a compensation circuit connected thereto in accordance with the principles of the invention.

DESCRIPTION OF THE PREFERRED EMBODIMENT

Referring to the drawing, a velocity-modulated tube 1 is schematically illustrated as having an input connected to a compensation circuit 2 which provides compensating amplitude distortions of the signal to be amplified by the velocity-modulated tube 1 as a means of preceding amplitude correction.

The output of the velocity-modulated tube is connected to a directional coupler 3 which has a first output connected to the main input of a circular 4. The directional coupler 3 has a second output for decoupling the amplified signal by way of a power transformer 5 and a demodulator 6. The demodulator 6 has an output connected to a controllable reactance, here a capacitance diode 8, by way of an adjustable damping member 7. The circulator 4 has a combination input/output in addition to its main input and main output. A transmission line 9 has one end thereof connected to the combination input/output of the circulator 4 and its other end terminated with the capacitance diode as its terminating impedance.

The signal which is to be amplified experiences an amplitude distortion in the compensation circuit 2 which precompensates an amplitude distortion occurring in the velocity-modulated tube 1. The signal which is amplified in the velocity-modulated tube 1 is taken from the tube and fed to the circulator 4 by way of its main input and the directional coupler 3. This signal teaches the capacitance diode 8 by way of the combination input/output of the circulator 4 and the transmission line 9, and is there reflected back toward the main input of the circulator 4 by way of the combination input/output including a phase modulation effected during the reflection. The control of the capacitance diode 8 must therefore be effected in such a way that the phase modulation of the reflected signal compensates the phase distortions which occur during the amplification in the velocity-modulated tube 1. The capacitance diode 8 will therefore be controlled on an amplitude modulation-dependent basis, also corresponding to the phase distortions at the output of the velocity-modulated tube 1. This control is effected with the help of the directional coupler 3 which decouples and extends the output signal of the tube to a power transformer 5 which increases the wave resistance. The demodulator 6 receives the output of the transformer 5 and demodulates the signal and provides a control voltage for the capacitance diode 8 in accordance with the phase distortions of the output signal of the tube 1. This control signal is fed by way of an adjustable damping member 7 to the capacitance diode 8 which accordingly controls the reactance of the capacitance diode 8 in such a way that the phase modulation of the reflected signal is opposite to the phase distortions. The adjustable damping member 7 provides for a precision adjustment of the capacitance diode 8.

The use of the foregoing techniques for combined amplitude and phase correction provides for extended modulation of velocity-modulated tubes. The phase correction is very stable and can be easily reproduced In addition, it is a particular advantage, for example, for powerful picture transmitters, that the differential phase errors which interfere with color television are decreased. As opposed to opposite coupling circuits, it is of great advantage that no transit times occur during the compensation as normally occur and have an interfering effect in an opposite coupling branch.

A compensation circuit connected to the output of the velocity-modulated tube has the further advantage that the phase equalization for paths between the directional coupler and the capacitance diode 8 is essentially less critical than with a compensation circuit connected to the input of the velocity-modulated tube.

Although I have described my invention by reference to a specific illustrative embodiment thereof, many changes and modifications of my invention may become apparent to those skilled in the art without departing from the spirit and scope of the invention, and it is to be understood that I intend to include within the patent warranted hereon, all such changes and modifications as may reasonably and properly be included within the scope of my contribution to the art.

What I claim is:

1. An amplifier circuit comprising: a velocity-modulated tube having an input for receiving a signal to be amplified and an output, a predistortion circuit connected to said input of said velocity modulated tube for initial amplitude compensation, and a compensation circuit connected to the output of said tube for compensating phase distortions, said compensation circuit comprising: a directional coupler having an input connected to the output of said tube and first and second outputs; a circulator having a main input connected to said first output, a main output and a combination input/output; a transmission line connected to said combination input/output to receive and deliver signals; a controllable reactance connected as the termination of said transmission line and having a control input, said transmission line and said controllable reactance effective to reflect the signal received from said circulator with phase modulations opposed to those of such received signal; a demodulator having an input and an output; means coupling the input of said demodulator to the second output of said directional coupler; and means coupling the output of said demodulator to the control input of said controllable reactance, said demodulator operable to derive the phase distorted modulation signal for controlling said reactance.

2. The amplifier according to claim 1, wherein said means coupling said directional coupler and said demodulator includes a transformer for increasing wave resistance.

3. The amplifier according to claim 1, wherein the last-mentioned coupling means includes adjustable damping means for adjusting the control of said reactance.

4. The amplifier according to claim 1, wherein said controllable reactance includes a capacitance diode.

5. The amplifier according to claim 1, wherein said means coupling said directional coupler and said demodulator includes a transformer for increasing wave resistance, said means coupling the output of said demodulator to the control input of said controllable reactance includes adjustable damping means for adjusting the control of said reactance, and said controllable reactance includes a capacitance diode.

* * * * *